(12) United States Patent
Motoyama

(10) Patent No.: US 7,249,269 B1
(45) Date of Patent: Jul. 24, 2007

(54) METHOD OF PRE-ACTIVATING NETWORK DEVICES BASED UPON PREVIOUS USAGE DATA

(75) Inventor: Tetsuro Motoyama, Cupertino, CA (US)

(73) Assignee: Ricoh Company, Ltd., Tokyo (JP)

( * ) Notice: Subject to any disclaimer, the term of this patent is extended or adjusted under 35 U.S.C. 154(b) by 467 days.

(21) Appl. No.: 10/938,306

(22) Filed: Sep. 10, 2004

(51) Int. Cl.
  *G06F 1/26* (2006.01)
(52) U.S. Cl. .................. 713/320; 713/324; 713/330
(58) Field of Classification Search ............... 713/300, 713/320, 324, 330, 340
  See application file for complete search history.

(56) References Cited

U.S. PATENT DOCUMENTS

| | | | |
|---|---|---|---|
| 5,086,385 A | 2/1992 | Launey et al. | |
| 5,156,203 A | 10/1992 | Funakoshi et al. | |
| 5,305,952 A | 4/1994 | Hannarong | |
| 5,682,949 A | 11/1997 | Ratcliffe et al. | |
| 5,900,026 A | 5/1999 | Ryu | |
| 5,954,820 A * | 9/1999 | Hetzler ...................... | 713/323 |
| 5,962,989 A | 10/1999 | Baker | |
| 6,260,111 B1 | 7/2001 | Craig et al. | |
| 6,263,260 B1 | 7/2001 | Bodmer et al. | |
| 6,297,746 B1 | 10/2001 | Nakazawa et al. | |
| 6,348,867 B1 | 2/2002 | Myllymäki | |
| 6,349,883 B1 | 2/2002 | Simmons et al. | |
| 6,408,395 B1 * | 6/2002 | Sugahara et al. ........... | 713/310 |
| 6,415,387 B1 | 7/2002 | Aguilar et al. | |
| 6,594,767 B1 * | 7/2003 | Wiley et al. ................ | 713/300 |
| 6,642,843 B2 | 11/2003 | Satoh | |
| 6,715,088 B1 * | 3/2004 | Togawa ...................... | 713/320 |
| 6,789,208 B2 * | 9/2004 | Noda et al. ................. | 713/323 |
| 6,867,699 B2 | 3/2005 | Curwen et al. | |
| 6,870,477 B2 | 3/2005 | Gruteser et al. | |
| 6,909,367 B1 | 6/2005 | Wetmore | |
| 2002/0010854 A1 | 1/2002 | Ogura et al. | |
| 2003/0171851 A1 | 9/2003 | Brickfield et al. | |
| 2005/0130653 A1 * | 6/2005 | Bisdikian et al. ......... | 455/432.3 |
| 2005/0204177 A1 | 9/2005 | Watts et al. | |

FOREIGN PATENT DOCUMENTS

| | | |
|---|---|---|
| EP | 0 838 791 A2 | 4/1998 |
| GB | 2 194 088 A | 2/1988 |
| WO | WO 02/13218 A1 | 2/2002 |

* cited by examiner

*Primary Examiner*—Chun Cao
*Assistant Examiner*—Malcolm D Cribbs
(74) *Attorney, Agent, or Firm*—Hickman Palermo Truong & Becker LLP; Edward A. Becker

(57) ABSTRACT

An approach for pre-activating network devices includes using prior usage of a network device to estimate times when the network device will be used in the future. The network device is then pre-activated, i.e., transitioned to an active operational state, prior to the estimated times so that the network device will be ready when needed. This reduces or eliminates delays in processing attributable to having to wait for the network device to transition to the active operational state.

27 Claims, 12 Drawing Sheets

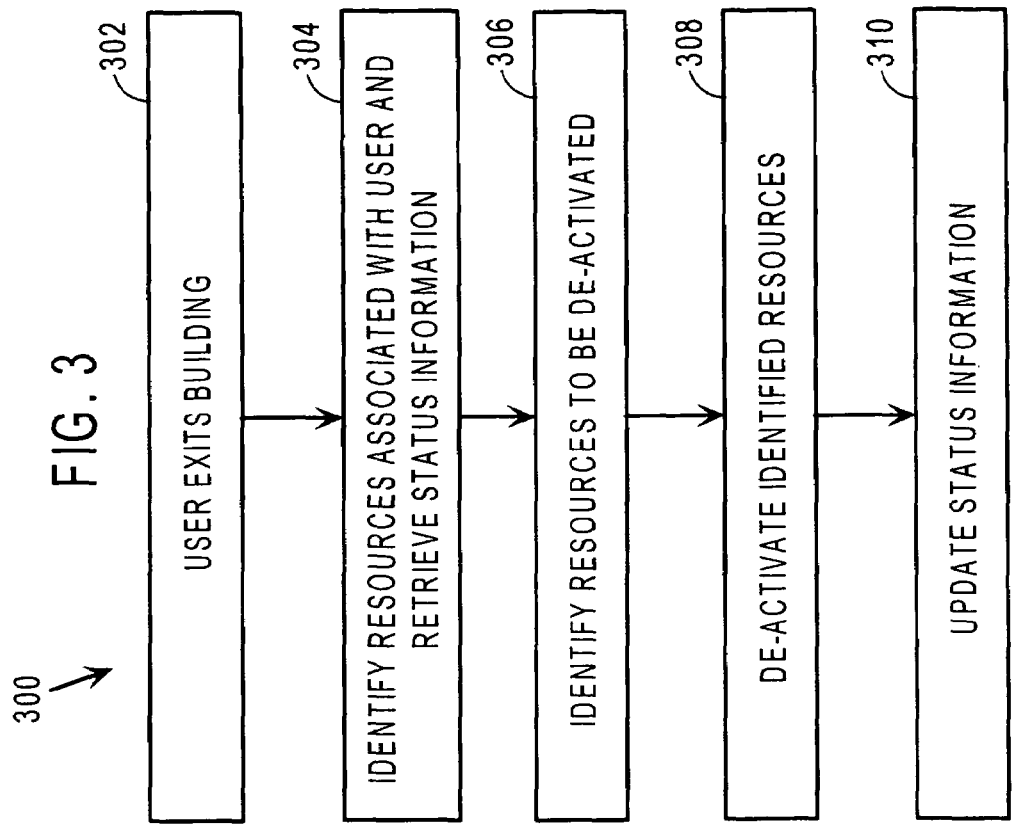
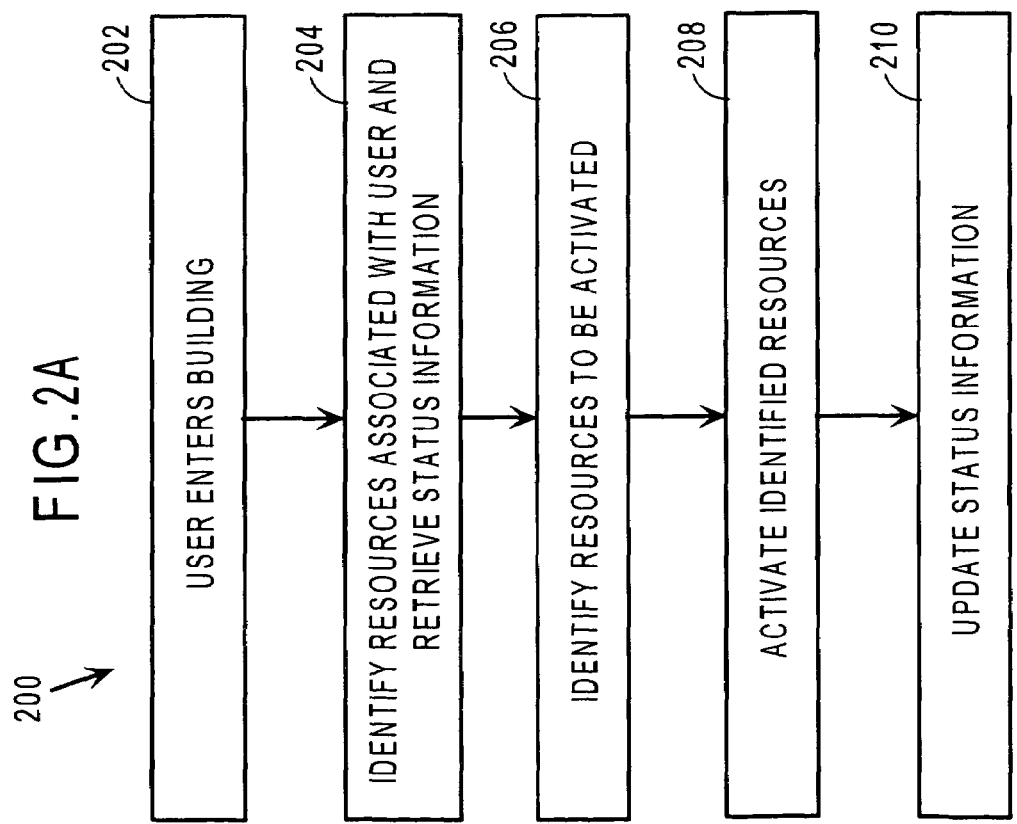

FIG. 14

USAGE DATA

| Time | Mon | Tues | Wed | Thurs | Fri | Sat | Sun |
|---|---|---|---|---|---|---|---|
| 00:00 | 0 | 0 | 0 | 0 | 0 | 0 | 2 |
| 00:15 | 0 | 0 | 0 | 0 | 0 | 0 | 2 |
| 00:30 | 0 | 0 | 0 | 0 | 0 | 0 | 2 |
| ⋮ | ⋮ | ⋮ | ⋮ | ⋮ | ⋮ | ⋮ | ⋮ |
| 09:45 | 7 | 8 | 3 | 9 | 6 | 1 | 0 |
| 10:00 | 4 | 6 | 3 | 8 | 5 | 2 | 0 |
| ⋮ | ⋮ | ⋮ | ⋮ | ⋮ | ⋮ | ⋮ | ⋮ |
| 12:30 | 2 | 2 | 1 | 3 | 1 | 1 | 0 |
| 12:45 | 1 | 3 | 2 | 1 | 2 | 0 | 0 |
| ⋮ | ⋮ | ⋮ | ⋮ | ⋮ | ⋮ | ⋮ | ⋮ |
| 14:45 | 4 | 5 | 6 | 4 | 7 | 0 | 0 |
| 15:00 | 9 | 6 | 7 | 4 | 5 | 0 | 0 |
| ⋮ | ⋮ | ⋮ | ⋮ | ⋮ | ⋮ | ⋮ | ⋮ |
| 23:30 | 0 | 0 | 0 | 0 | 0 | 0 | 2 |
| 23:45 | 0 | 0 | 0 | 0 | 0 | 0 | 3 | n WEEKS — 1402

1400

METHOD OF PRE-ACTIVATING NETWORK DEVICES BASED UPON PREVIOUS USAGE DATA

RELATED APPLICATIONS

This application is related to U.S. patent application Ser. No. 10/245,935, filed on Sep. 17, 2002 and now issued as U.S. Pat. No. 6,748,299 and entitled "Approach for Managing Power Consumption in Buildings". This application is also related to U.S. patent application Ser. No. 10/371,379, filed on Feb. 20, 2003 and now issued as U.S. Pat. No. 6,766,223 and entitled "Approach for Managing Power Consumption of Network Devices". The contents of both applications are hereby incorporated herein by reference in their entirety for all purposes.

FIELD OF THE INVENTION

The invention relates to networked devices generally, and more specifically, to an approach for managing network devices.

BACKGROUND OF THE INVENTION

Reducing power consumption has become an important issue for businesses because of environmental concerns and the rising costs of electricity. In addition to managing electricity consumption attributable to lighting and heating and air cooling systems, corporations have to manage increased electricity usage attributable to communications networks and computer systems. This includes, for example, local area networks (LANs), and all of the network devices connected thereto, such as personal computers and shared network devices, such as copiers, printers, scanners and facsimile machines.

Corporations have made significant progress in reducing power consumption through employee education programs that encourage employees to turn off their lights and personal computers when they leave work each day. The success of this approach depends upon the diligence of employees in turning off lights, computers and other equipment when not in use. Some types of equipment take a long time to power up from a powered down state. For example, it is not uncommon for personal computers to require several minutes to "boot up." Other types of equipment, such as copy machines and laboratory instruments, can require even more time to complete a power up cycle. These delays can have an adverse effect on productivity in situations where large numbers of employees are waiting for equipment to power up. As a result of these long delays, many employees leave equipment on all the time.

Another approach has been to configure certain types of equipment, such as personal computers and shared network devices, with a power saving mode of operation. A power saving mode is an operating mode in which a device consumes less power, typically by shutting down one or more subsystems or services. For example, when configured with a power saving mode, personal computers typically shut down the hard disk and monitor after a specified amount of time has passed without any keyboard or mouse activity. When keyboard or mouse activity resumes, power is restored to all components and the personal computer returns to the regular power state. Other types of shared network devices may also be configured with power saving modes of operation. For example, a copier or printer may be configured to shut down certain mechanical functions, such as a fuser module, but maintain power to an electronics module that contains the controller. A copier or printer may enter a power saving mode after no request to copy or print a document has been received for a specified amount of time. When the copier or printer receives a request to copy or print a document, then power is restored to the mechanical functions so that the copying and printing functions may be performed. The use of power saving modes of operation in personal computers and other shared network devices can save a significant amount of power.

One drawback of this approach is that personal computers and shared network devices still consume power in a power saving mode, albeit at a reduced rate. Furthermore, the transition from power saving mode to regular operating mode can require several seconds or even minutes, depending upon the particular implementation. For example, some shared network devices, such as copiers and printers, can require several minutes to "warm up", i.e., transition, from a power saving mode to a full active mode, before a document can be copied or printed. Another drawback of this approach is that many older computers and shared network devices are not configured with power saving modes of operation.

Based on the need to reduce the amount of power consumed by network devices and computer systems and the limitations in prior approaches, an approach for managing network devices that does not suffer from the limitations of prior approaches is highly desirable.

SUMMARY OF THE INVENTION

According to one aspect of the invention, an approach is provided for managing power consumption of a network device. According to the approach, a determination is made whether one or more state change criteria for the network device are satisfied. Examples of state change criteria include, without limitation, whether the network device needs to be operating in a different operational state to perform a specified function, whether a specified function has been completed and whether a user of the network device as entered or left a building. If the one or more state change criteria are satisfied, then the network device is signaled over a communications network to cause the network device to change from a first operational state in a plurality of operational states to a second operational state in the plurality of operational states. The network device consumes a different amount of power when operating in the second operational state relative to when the network device is operating in the first operational state signal is received that indicates that a user has entered or left the building. The approach is applicable to all types of network devices including, without limitation, computers, laboratory equipment and instruments, copy machines, facsimile machines, printers, postage machines, lights and heating and air conditioning systems.

According to another aspect of the invention, a determination is made whether one or more other state change criteria for the network device are satisfied. If so, then the network device is signaled over a communications network to cause the network device to change from the second operational state to a third operational state in the plurality of operational states. The network device consumes a different amount of power when operating in the third operational state relative to when the network device is operating in the second operational state.

BRIEF DESCRIPTION OF THE DRAWINGS

Embodiments are illustrated by way of example, and not by way of limitation, in the figures of the accompanying drawings in which like reference numerals refer to similar elements and in which:

FIG. 2A is a block diagram that depicts an approach for managing power during building entry according to an embodiment of the invention;

FIG. 3 is a block diagram that depicts an approach for managing power during building exit according to an embodiment of the invention;

FIG. 14 depicts a table of example usage data collected for a printing device over a seven-day, 24 hours per day, period.

DETAILED DESCRIPTION OF THE INVENTION

Figure 1:
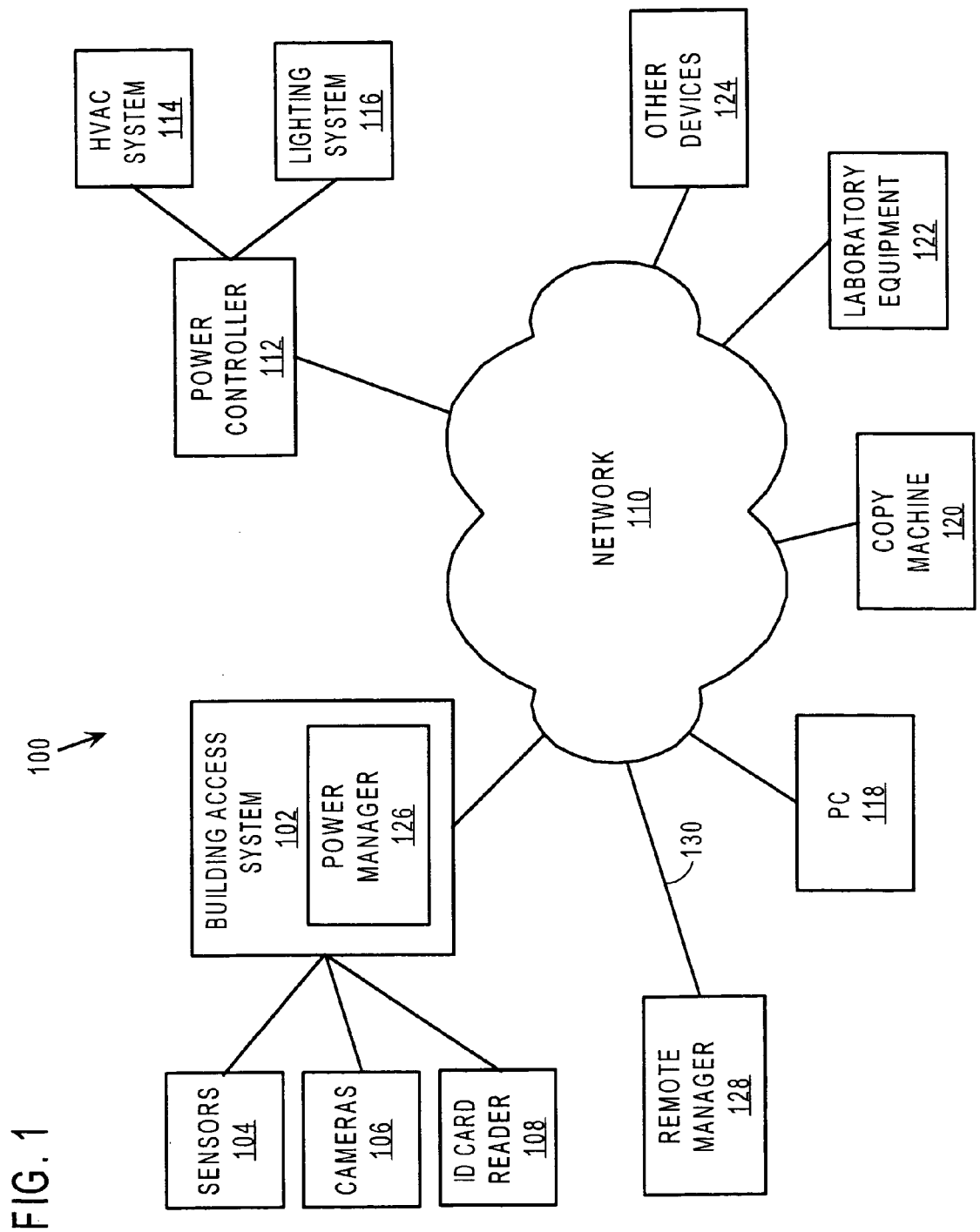
FIG. 1 is a block diagram that depicts an arrangement for managing power consumption in a building according to an embodiment of the invention.

In the following description, for the purposes of explanation, specific details are set forth in order to provide a thorough understanding of the invention. However, it will be apparent that the invention may be practiced without these specific details. In some instances, well-known structures and devices are depicted in block diagram form in order to avoid unnecessarily obscuring the invention. Various embodiments and aspects of the invention are described hereinafter in the following sections:

I. Overview
II. Power Management Architecture
III. Managing Power During Building Entry and Exit
IV. Implementation Mechanisms
V. Remote Management Applications
VI. Operational State Hierarchies
VII. Example Multi-Function Peripheral (MFP) Architecture
VIII. Network Device Pre-Activation
  A. Usage Data
  B. Collecting and Storing Usage Data
  C. Using Usage Data to Estimate Future Usage of a Network Device
  D. Updated to Usage Data
  E. Using Pre-Activation With Building Access Detection I. Overview An approach for managing power consumption of network devices includes determining whether one or more state change criteria for a network device are satisfied. The state change criteria may include a variety of criteria, depending upon the requirements of a particular implementation and the invention is not limited to any particular state change criteria. Examples of state change criteria include, without limitation, whether the network device needs to be operating in a different operational state to perform a specified function and whether a specified function has been completed.

If the one or more state change criteria for the network device are satisfied, then the network device is signaled over a communications network to cause the network device to change operational states. According to one embodiment of the invention, the signaling causes the network device to change from a first operational state in a plurality of operational states to a second operational state in the plurality of operational states. The network device consumes a different amount of power when operating in the second operational state relative to when the network device is operating in the first operational state.

For example, suppose that when operating in the first operational state, the network device is operating in a "sleep" state. In the sleep state, power is supplied to a controller, but not to a mechanical module, such as a printer module in the network device. Suppose further that the state change criteria includes whether the network device needs to be operating in a different operational state to perform a specified function. In the present example, assume that a printer module in the network device is now, or soon will be, required to print an electronic document. This may occur, for example, because it is known that a particular electronic document needs to be printed, or because a user of the network device has entered a building and it is likely that the user will soon need to use the printing capabilities provided by the printer module of the network device.

Since the state change criteria has been satisfied, the current operational state of the network device is changed from the sleep mode to a second operational state where power is supplied to the printer module so that the functionality of the printer module is available. The network device consumes more power in the second operational state relative to the first (sleep) operational state since, when the network device is operating in the second operational state, power is applied to the printer module.

As another example, suppose that the network device is currently operating in the aforementioned second operational state. Suppose further that the state change criteria includes whether the specified function has been completed. Once the electronic document has been printed, the printer module is no longer needed and the state change criteria is again satisfied. In this situation, however, the current operational state of the network device is changed from the second operational state where power is supplied to the printer module back to the sleep mode so that the amount of power consumed by the network device is reduced.

According to another embodiment of the invention, an approach for managing power consumption of resources includes receiving a signal that indicates that a user has entered or left the building. In response to receiving the signal, one or more resources in the building are transitioned between a first state and a second state. When operating in the first state, the one or more resources consume relatively less power relative to when the one or more resources are operating in the second state. The approach is applicable to all types of resources, including private resources that are used primarily by the user, and shared resources that are used by the user and other users. Example resources include, without limitation, computers, laboratory equipment and instruments, copy machines, facsimile machines, printers, postage machines, lights and heating and air conditioning systems.

According to one embodiment of the invention, a determination is made, based upon the signal and status data, whether the user has entered the building or left the building. If the user has entered the building, then the one or more resources are transitioned from the first state to the second state. If the user has left the building, then the one or more resources are transitioned from the second state to the first state.

According to another embodiment of the invention, a determination is made, based upon the signal and status data, whether the user was either the first user to enter the building or the last user to leave the building. If the user was the first user to enter the building, then one or more shared resources are transitioned from the first state to the second state. If the user was the last user to leave the building, then the one or more shared resources are transitioned from the second state to the first state.

II. Power Management Architecture

FIG. 1 is a block diagram that depicts an arrangement for managing power consumption of network devices, in the context of resources within a building, according to an embodiment of the invention. Arrangement 100 includes a building access system 102 communicatively coupled to sensors 104, cameras 106 and an ID card reader 108.

Building access system 102 monitors and tracks individuals who enter and leave the building based upon data from sensors 104, cameras 106 and ID card reader 108. For example, access to the building may be restricted to individuals who have a valid ID card. To enter the building, an individual must first have their ID card read by ID card reader 108. ID card reader 108 provides identification data from the ID card to building access system 102 that verifies the identification data stored at the ID card against valid identification data maintained by building access system 102. If the identification data matches valid identification data maintained by building access system 102, then access to the building is granted, e.g., by unlocking a door. If the identification data does not match valid identification data maintained by building access system 102, then access to the building is denied. Building access system 102 may also maintain data that indicates dates and time of successful and unsuccessful accesses, e.g., on a non-volatile storage.

Building access system 102 is coupled to a network 110 for communicating with other elements as described hereinafter. Network 110 may be any type of medium or mechanism that provides for the exchange of data between the connected elements. Example networks include, without limitation, Local Area Networks (LANs), Wide Area Networks (WANs), the Internet, and combinations thereof, and the invention is not limited to any particular type of network or network arrangement.

Arrangement 100 also includes a power controller 112 that is communicatively coupled to and manages power for a heating ventilation air conditioning (HVAC) system 114 and a lighting system 116. Arrangement 100 further includes a personal computer (PC) 118, a copy machine 120, laboratory equipment 122 and other devices 124, that are each communicatively coupled to network 110. Arrangement 100 also includes a power manager 126 configured to manage power consumption in the building, in accordance with an embodiment of the invention.

III. Managing Power During Building Entry and Exit

FIG. 2A is a flow diagram 200 that depicts an approach for managing power consumption of network devices, in the context of resources within a building, according to an embodiment of the invention. In step 202, a user makes a successful entry into the building. As previously described herein, a successful entry is made when the user is identified as having the authority to enter the building. For example, the user has an identification card scanned by ID card reader 108 and verified by building access system 102.

In step 204, power manager 126 identifies private and shared resources associated with the user and retrieves status information for the identified resources. The status information indicates the current status of the identified resources, namely, whether the resources are on or off. Power manager 126 also identifies the other users associated with the same resources. Power manager 126 may maintain data that specifies associations between users and resources to enable power manager 126 to quickly determine which resources are associated with particular users. Power manager 126 may also maintain status data that indicates the current status of resources. Both types of data may be maintained by power manager 126 in local non-volatile storage, such as one or more disks, or remotely, e.g., in a remote database, as described in more detail hereinafter.

In step 206, power manager 126 identifies which of the private and shared resources are to be activated. In general, these are the resources that the user will need. Thus, power manager 126 identifies resources that are associated with the user that are currently off. For example, power manager 126 may determine that private resources, such as the user's PC and office lights are currently off and will be needed by the user. As another example, power manager 126 may determine that shared resources, such as hallway lights, copy machines, laboratory equipment, or other devices, are currently off and will be needed by the user.

Figures 2B, 2C:
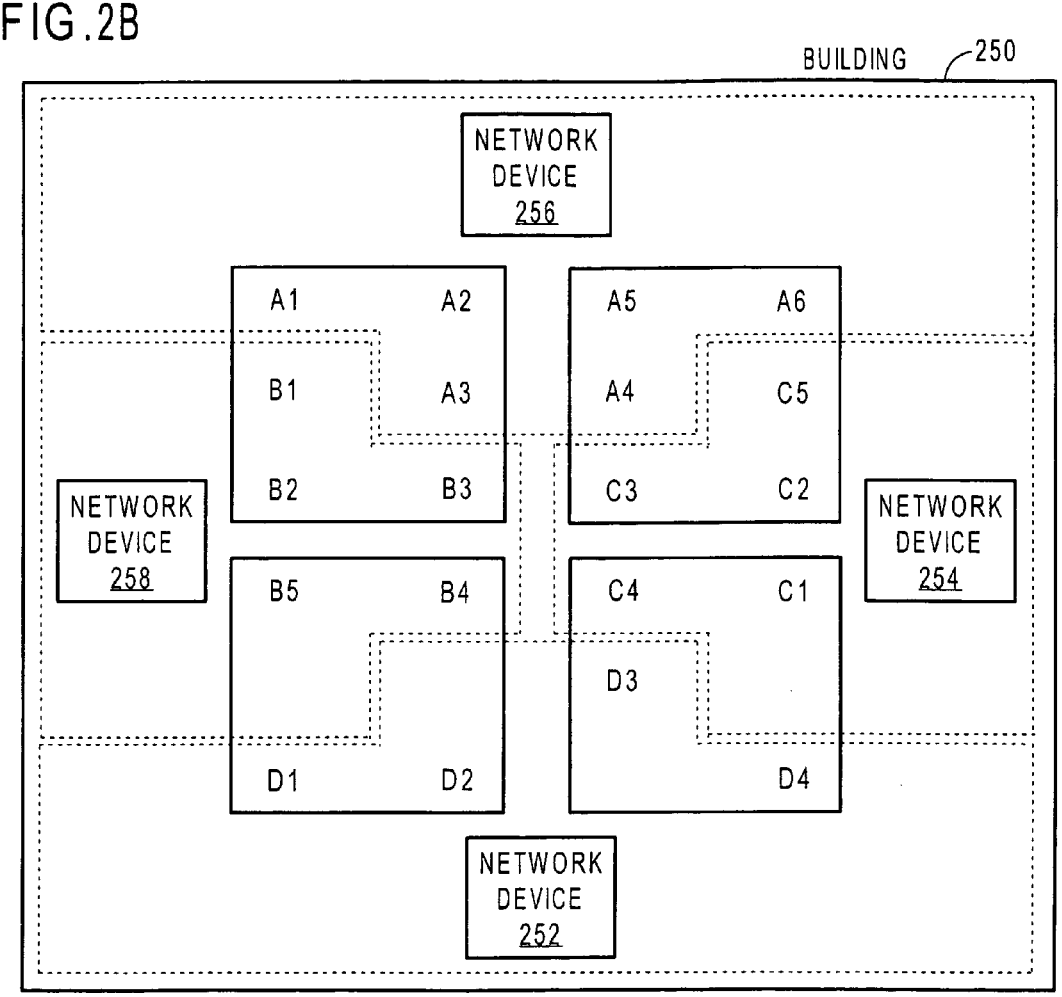
FIG. 2B is a block diagram that depicts a building having network devices and users.
FIG. 2C is a table that depicts relationships between shared network devices and users.

For example, FIG. 2B is a block diagram that depicts a building 250 having network devices 252, 254, 256, 258 and users A1-A6, B1-B5, C1-C5 and D1-D4. As depicted by FIG. 2B and a table 270 of FIG. 2C, users A1-A6 are logically associated with network device 256, users B1-B5 are logically associated with network device 258, users C1-C5 are logically associated with network device 254 and users D1-D4 are logically associated with network device 252. The aforementioned logical associations may be based upon physical associations. For example, as depicted in FIG. 2B, users A1-A6 are physically located closer to network device 256 than network devices 252, 254 and 258. Thus, users A1-A6 are configured to use network device 256. For example, in the context where network devices 252-258 are shared devices such as printers, personal computers associated with users A1-A6 are configured to print to network device 256, rather than network devices 252, 254 and 258.

Similarly, the personal computers associated with users B1-B5 are configured to print to network device 258, the personal computers associated with users C1-C5 are configured to print to network device 254 and the personal computers associated with users D1-D4 are configured to print to network device 252.

Suppose that user A1 has entered building 250. In step 206, power manager 126 consults table 270 of FIG. 2C and determines that network device 256 is logically associated with user A1 and is currently off, or in a sleep mode. Thus, the operational state of network device 256 needs to be changed to an operational state that will allow user A1 to use network device 256.

In step 208, power manager 126 activates the resources. The particular actions taken to activate a resource may vary depending upon the type and attributes of the resource to be activated. For example, for some resources, such as copy machine 120, power manager 126 sends a signal to activate copy machine 120. The signal may cause copy machine 120 to transition from an off or "sleep" state to an active state. Alternatively, power manager 126 may signal another entity, such as power controller 112, to apply power to copy machine 120.

As another example, to activate the user's PC 118, power manager 126 may send a signal to a network interface card (NIC) in PC 118 to cause PC 118 to transition from an off or "sleep" state to an active state. As yet another example, power manager 126 may send a signal to power controller 112 requesting that HVAC system 114 and lighting system 116 be activated to provide HVAC services and lighting to the physical area where the user will need those services.

In step 210, the status information is updated to reflect any changes that were made. For example, according to one embodiment of the invention, power manager 126 updates the status information stored on non-volatile storage to reflect the resources that were activated and that the user is now inside the building.

According to this approach, resources required by the user are activated when the user enters the building. This is particularly helpful in situations where resources require several minutes to be activated because the resources will be at least partially activated, and ideally fully activated, by the time the user reaches their working area.

FIG. 3 is a flow diagram 300 that depicts an approach for managing power during building exit according to an embodiment of the invention. In step 302, a user exits the building and building access system 102 is aware that the user has exited the building.

In step 304, power manager 126 identifies private and shared resources associated with the user and retrieves status information for the identified resources. The status information indicates the current status of the identified resources, namely, whether the resources are currently on or off. Power manager 126 also identifies the other users associated with the same resources.

In step 306, power manager 126 identifies which of the private and shared resources are to be de-activated. In general, these are the resources that the user will no longer need to use. Thus, power manager 126 identifies private resources that are associated with the user that are currently on and should be turned off. For example, power manager 126 may determine that the user's PC and office lights (private resources) are currently on. For shared resources, power manager 126 examines the status information to identify shared resources that are both associated with the user and no longer needed by the user or any other users. For example, power manager 126 may determine that hallway lights, a copy machine, laboratory equipment, or other devices (shared resources) are currently on and that the user is the last user in the building associated with these shared resources. These resources are identified for de-activation. Shared resources that are associated with both the user and at least one other user that is still in the building are not selected for de-activation.

In step 308, power manager 126 de-activates the identified resources. The steps required to de-activate a particular resource vary from resource to resource. For example, to de-activate HVAC system 114 and lighting system 116, power manager 126 sends a signal to power controller 112 requesting that power controller 112 de-activate HVAC system 114 and lighting system 116. For other devices, such as PC 118 or copy machine 120, currently-executing processes are permitted to finish processing before the devices are de-activated. For example, to de-activate copy machine 120, power manager 126 sends a command to copy machine 120. Copy machine 120 finishes processing any current copy jobs and then enters the off or "sleep" state.

As another example, power manager 126 may send a de-activate or "sleep" command to PC 118, e.g., to a network interface card (NIC) in PC 118, which queues the command until processes that are currently executing are completed. Once those processes have completed their processing, the NIC causes PC 118 to enter an off or "sleep" state. These steps may be performed, for example, by an application executing on PC 118 or by an operating system function. Alternatively, if power manager 126 is aware of the processes executing on PC 118, then power manager 126 may cause the termination of those processes remotely and then issue the off or "sleep" command to PC 118. The processes may be closed simultaneously or one by one, depending upon the type of PC 118 and processes.

Figure 4:
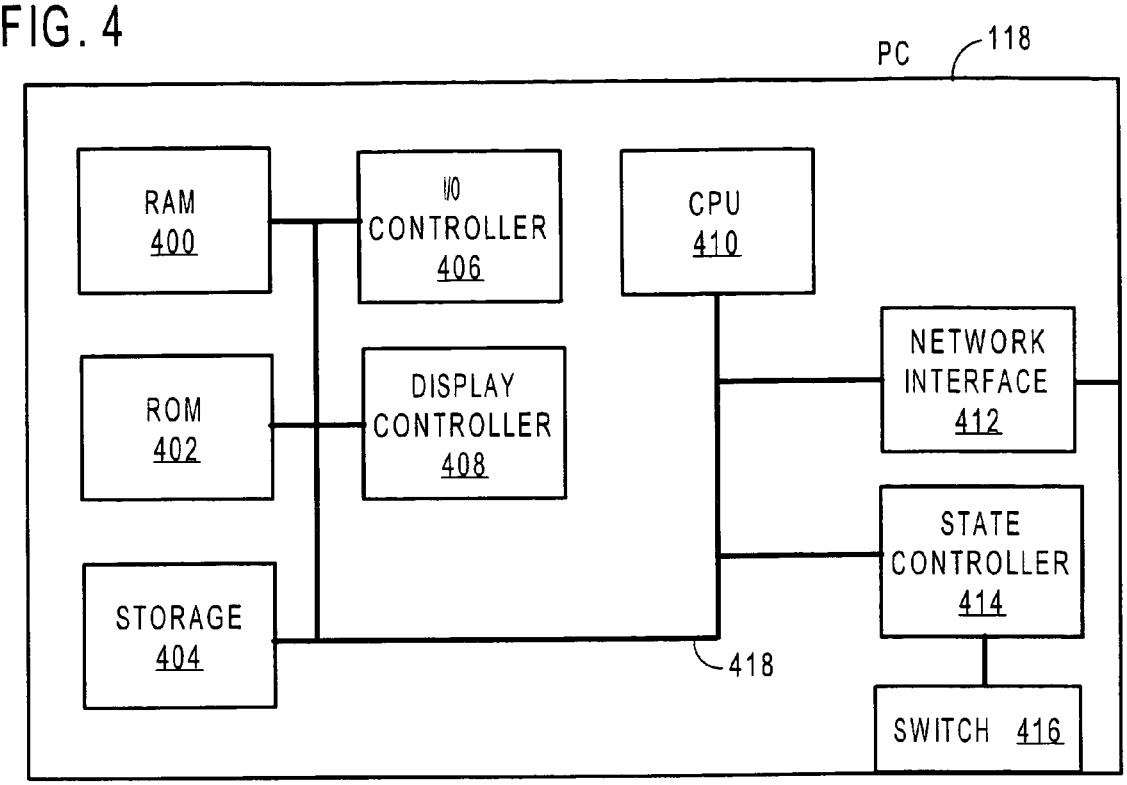
FIG. 4 is a block diagram that depicts an example implementation of a personal computer configured in accordance with an embodiment of the invention.

FIG. 4 is a block diagram that depicts an example implementation of PC 118. In this example, PC 118 includes a random access memory (RAM) 400, a read-only memory (ROM) 402 and storage 404, such as one or more disks, optical disks, flash memories, tape drives, or a combination thereof. PC 118 also includes an input/output (I/O) controller 406, a display controller 408, a central processing unit (CPU) 410, a network interface 412, a state controller 414 and a switch 416. All of these components, except for switch 416, are communicatively coupled to each other via a bus 418. Switch 416 is manually accessible and allows a user to manually change the state of PC 118, e.g., between off and on states.

In operation, network interface 412 is configured to receive external signals, e.g., state change signals from power manager 126, and provide those signals to state controller 414 via bus 418. State controller 414 controls the state of PC 118. For example, power manager 126 issues a "sleep" command to PC 118 that is received by network interface 412. Network interface 412 provides the "sleep" command to state controller 414, which causes PC 118 to enter the "sleep" state. In the "sleep" state, PC 118 consumes relatively less power than when operating in the active or fully "on" state. As described herein, one or more processes that are executing at the time the "sleep" command is received by PC 118 are shut down before PC 118 is put into the "sleep" state.

In step 310, the status information is updated to reflect any changes that were made. For example, according to one embodiment of the invention, power manager 126 updates the status information stored on non-volatile storage to reflect the resources that were de-activated and that the user is now outside the building.

According to this approach, private resources required by the user are de-activated when the user exits the building. Also, shared resources that are no longer required by the user or any other users are also de-activated. This provides a significant reduction in the amount of power consumed by the private and shared resources, since they are de-activated when the users that require those resources exit the building.

IV. Implementation Mechanisms

Figure 5:
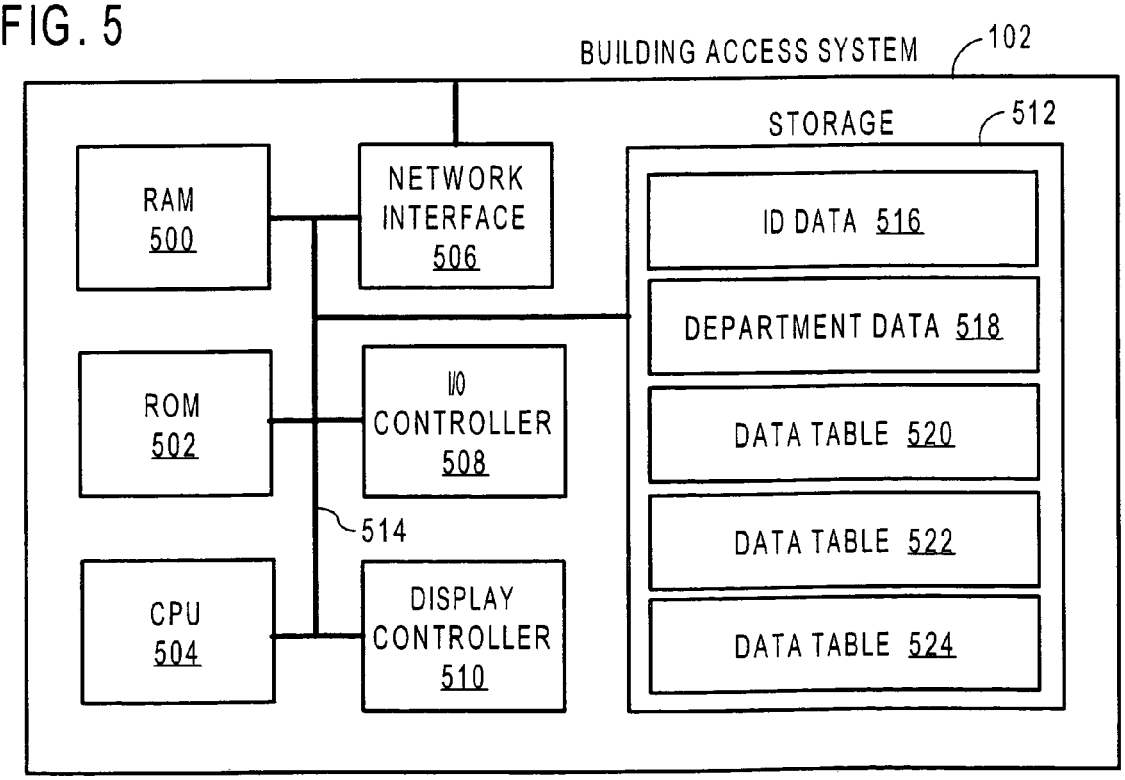
FIG. 5 is a block diagram that depicts an example implementation of building access system, in accordance with an embodiment of the invention.

FIG. 5 is a block diagram that depicts an example implementation of building access system 102. In this example, building access system 102 includes a RAM 500, a ROM 502, a CPU 504, a network interface 506, an I/O controller 508, a display controller 510 and a storage 512 that are communicatively coupled to each other via a bus 514. In this example, power manager 126 and the building access functions are implemented as processes executed by CPU 504. The instructions executed by CPU 504 to perform these functions may be stored in RAM 500, ROM 502, storage 512, or any combination thereof.

Storage 512 may be implemented by any type of storage mechanism, such as one or more hard disks, optical disks, flash memories, tape drives, or a combination thereof, and the invention is not limited to any particular implementation. In the present example, storage 512 includes ID data 516, department data 518 and data tables 520, 522, 524. ID data 516 includes user identification data that specifies valid user IDs that may be used by building access system 102 to determine whether to allow users to access to the building. The user IDs are also used by power manager 126 as described herein to manage power consumption. Department data 518 is data that specifies a logical group within a building or organization, i.e., a department of a corporation, and the users that are members of the logical group.

Figure 6A:
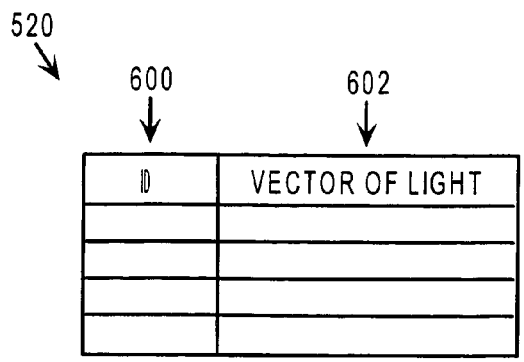
FIGS. 6A-6C are block diagrams that depict example implementations of data tables according to an embodiment of the invention.
Figure 6B:
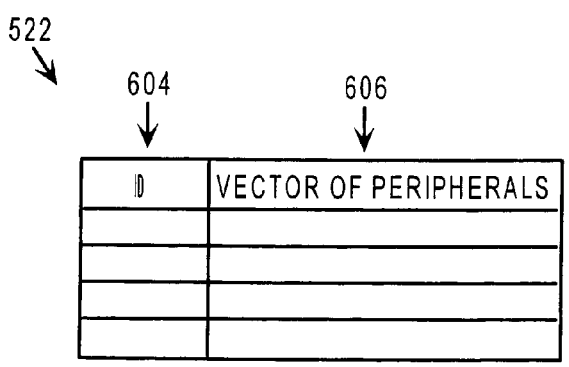
Figure 6C:
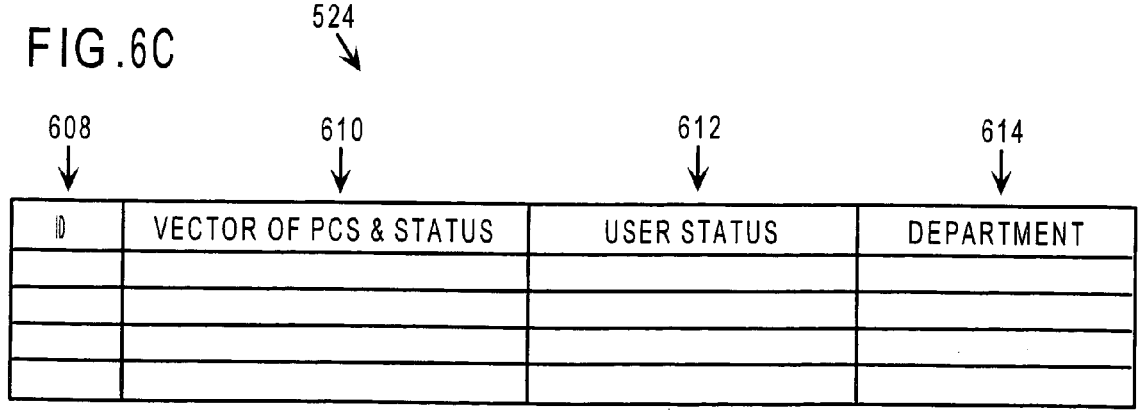

Data tables 520, 522, 524 contain data that is used to manage power consumption of network devices and resources as described herein. FIGS. 6A-6C are block diagrams that depict example implementations of data tables 520, 522, 524, according to an embodiment of the invention. In FIG. 6A, data table 520 is implemented as a table with a column 600 that contains user IDs and a column 602 that specifies private resources, in this example a vector of lights, associated with each user ID. In FIG. 6B, data table 522 is implemented as a table with a column 604 that contains user IDs and a column 606 that specifies private resources, in this example a vector of peripherals, associated with each user ID. In FIG. 6C, data table 524 is implemented as a table with a column 608 that contains user IDs, a column 610 that specifies a vector of PCs and status for each user ID in Column 606, a user status column 612 that specifies whether the user is in or out of the building and a department column 614 that specifies a logical group, in this example a department, with which the user is associated.

Figure 7A:
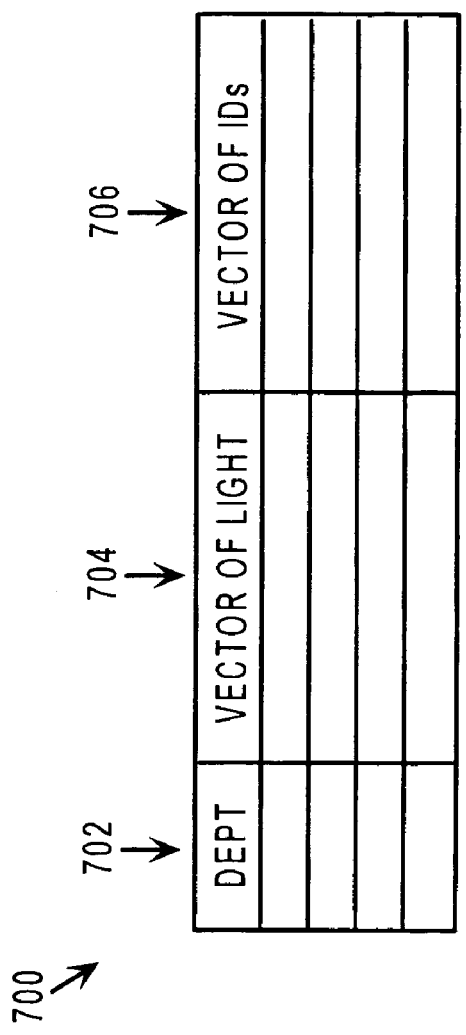
FIGS. 7A and 7B are block diagrams that depict example data tables according to another embodiment of the invention.
Figure 7B:
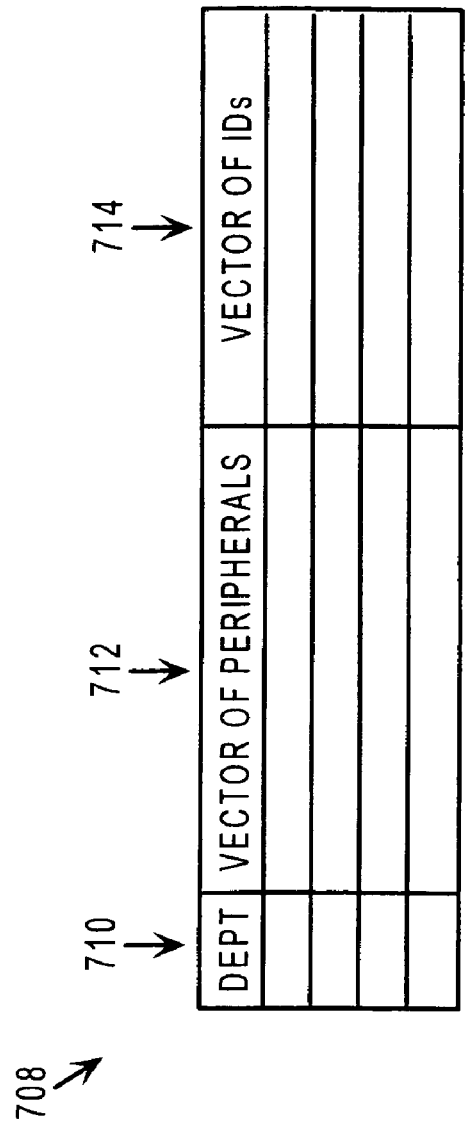

FIGS. 7A and 7B are block diagrams that depict example data tables 700, 708 that may be maintained on storage 512 according to an embodiment of the invention. In this example, data tables 700, 708 contain shared resource information used by power manager 126 to manage power in the building. For example, data table 700 includes a department column 702 that specifies a particular department, a vector of lights column 704 that stores a vector of lights associated with each department in column 702 and a vector of IDs column 706 that stores a vector of user IDs associated with each department in column 702. As another example, in FIG. 7B, data table 708 includes a department column 710 that specifies a particular department, a vector of peripherals column 712 that stores a vector of peripherals associated with each department in column 710, and a vector of IDs column 714 that stores a vector of user IDs associated with each department in column 710.

Although FIGS. 6A-6C, 7A and 7B depict specific examples of data maintained on storage 512, the invention is not limited to these particular examples, and any type of data may be stored depending upon the requirements of a particular application.

Figure 8:
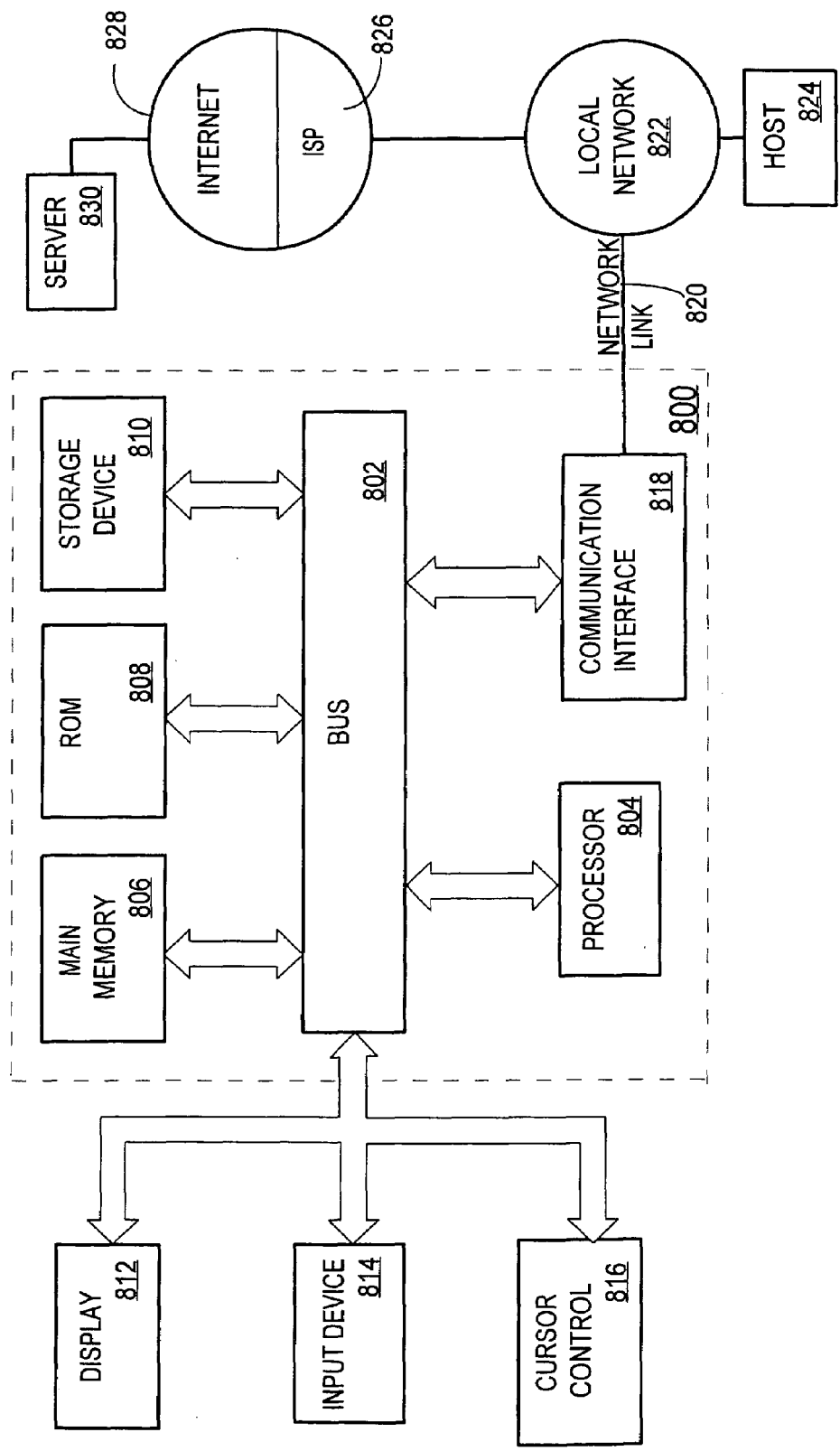
FIG. 8 is a block diagram of a computer system on which embodiments of the invention may be implemented.

FIG. 8 is a block diagram that illustrates a computer system 800 upon which an embodiment of the invention may be implemented. Computer system 800 includes a bus 802 or other communication mechanism for communicating information, and a processor 804 coupled with bus 802 for processing information. Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

The invention is related to the use of computer system 800 for managing power consumption of network devices and resources. According to one embodiment of the invention, the management of power consumption of network devices and resources is provided by computer system 800 in response to processor 804 executing one or more sequences of one or more instructions contained in main memory 806. Such instructions may be read into main memory 806 from another computer-readable medium, such as storage device 810. Execution of the sequences of instructions contained in main memory 806 causes processor 804 to perform the process steps described herein. One or more processors in a multi-processing arrangement may also be employed to execute the sequences of instructions contained in main memory 806. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 804 for execution. Such a medium may take many forms, including but not limited to, non-volatile media, volatile media, and transmission media. Non-volatile media includes, for example, optical or magnetic disks, such as storage device 810. Volatile media includes dynamic memory, such as main memory 806. Transmission media includes coaxial cables, copper wire and fiber optics, including the wires that comprise bus 802. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infrared transmitter to convert the data to an infrared signal. An infrared detector coupled to bus 802 can receive the data carried in the infrared signal and place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the worldwide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818. In accordance with the invention, one such downloaded application provides for the management of power consumption of network devices and resources as described herein.

The received code may be executed by processor 804 as it is received, and/or stored in storage device 810, or other non-volatile storage for later execution. In this manner, computer system 800 may obtain application code in the form of a carrier wave.

Although embodiments of the invention have been described herein in the context of managing power consumption in buildings, the approach is not limited to office buildings and is applicable to any type of structure or arrangement. For example, the approach is applicable to managing power consumption in office buildings, apartment buildings and homes. Also, although embodiments of the invention have been described herein in the context of managing power consumption in buildings upon entry and exit to a building, the approach is also applicable to entry and exit to different portions of a building or complex. For example, the approach is applicable to situations where a user has entered a portion of a building or complex that the user was not in, or left a portion of a building or complex for at least a specified period of time. This may be implemented, for example, in situations where a user is required to present for verification an ID card to move between the different portions of the building or complex, e.g., via internal doors, hallways, causeways, etc., so that the movement can be detected and tracked. The approach is also applicable to situations where user identification is checked at a location external to a building, for example at a guard house or surrounding gate.

Power manager 126 may be implemented in hardware, computer software, or a combination of hardware and computer software and the invention is not limited to any particular implementation. Furthermore, although embodiments of the invention have been described in the context of power manager 126 being implemented as part of building access system 102, the invention is not limited to this implementation. The approach may be implemented in any of the other components in arrangement 100. Alternatively, the approach may be implemented as a stand-alone mechanism that interacts with the various components of arrangement 100.

The approach described herein for managing power consumption of network device and resources reduces the amount of power consumed by resources, while reducing the amount of time that users have to wait for resources to power up when they enter a building.

V. Remote Management Applications

The approach described herein for managing power consumption of network devices and resources is applicable to remote management applications where a power manager mechanism is located remotely with respect to one or more network devices. In this situation, the remote power manager manages the operational states of network devices over one or more communications networks. For example, the remote power manager may perform remote data collection, remote maintenance and remote diagnostics. The power requirements may be different for all three cases. For example, performing remote diagnostics may require a fully functioning mechanical system in a network device, while remote data collection may need only require the reporting of electronically stored data. Also, such remote access may be preformed during the night when the power levels of the network devices may not be known to the remote power manager.

For example, referring to FIG. 1, a remote manager 128 is communicatively coupled to network 110 via a communications link 130 that may be any type of communications link and include one or more networks. In accordance with an embodiment of the invention, remote manager 128 is configured to manage power consumed by network devices, such as PC 118, copy machine 120, laboratory equipment 122 and other devices 124. Remote manager 128 determines whether one or more state change criteria for a particular network device are satisfied. If the one or more state change criteria for the particular network device are satisfied, then remote manager 128 signals the particular network device over communications link 130 and network 110 to cause the particular network device to change from a first operational state in a plurality of operational states to a second operational state in the plurality of operational states. The network device consumes a different amount of power when operating in the second operational state relative to when the network device is operating in the first operational state. When a determination is made that the particular network device no longer needs to operate in the second operational state, then remote manager 128 signals the particular network device to cause the particular network device to transition back to the first operational state.

VI. Operational State Hierarchies

The approach described herein for managing power consumption of network devices and resources is applicable to network devices and resources having any number of operational modes. Some network devices are configured with two or more operation modes to provide finer granularity of operation.

Figure 9:
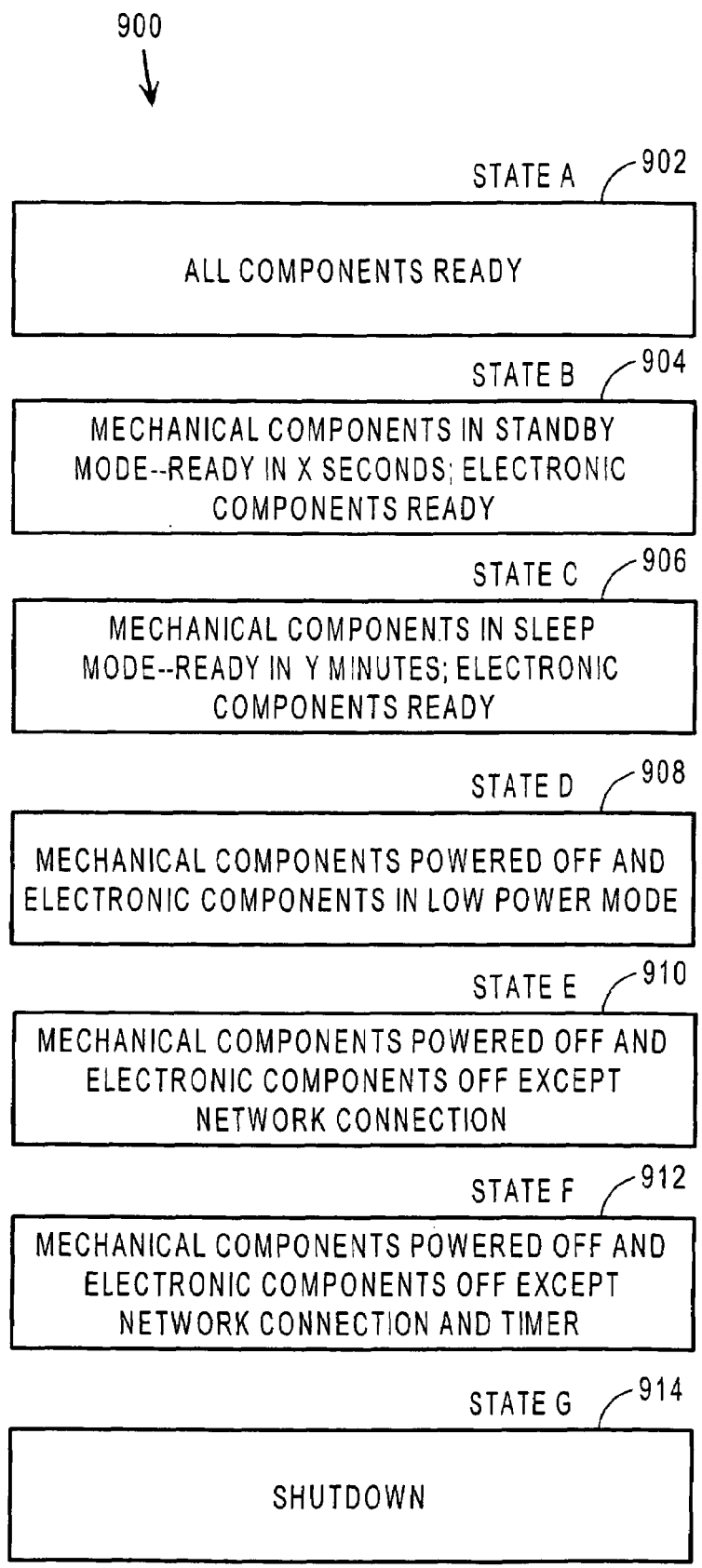
FIG. 9 is a block diagram that depicts a operational mode hierarchy for a network device, according to an embodiment of the invention.

FIG. 9 is a block diagram that depicts a operational mode hierarchy 900 for a network device. Hierarchy 900 includes states 902-914, labeled State A-State G, respectively, that represent an operational continuum over which the network device operates. The network device consumes the most power when operating in State A, 902 and relatively little or no power when in State G, 914. Specifically, when operating in State A 902, power is supplied to all components in the network device and all components are ready.

When operating in State B, 904, one or more mechanical components are operating in a standby mode and are ready to respond in X seconds. In this state, the electronic components are ready.

When operating in State C, 906, one or more mechanical components are operating in a sleep mode and are ready to respond in Y minutes. In this state, the electronic components are ready.

When operating in State D, 908, one or more mechanical components are powered off and the electronic components are in a low power mode, but are still able to respond to requests.

When operating in State E, 910, one or more mechanical components are powered off and the electronic components are powered off except for a network connection. If a network signal is received at the network connection, then the network device may transition from State E 910 to State D 908 so that the network signal may be processed.

When operating in State F, 912, one or more mechanical components are powered off and the electronic components are power off except for a network connection and a timer. In this state, the network device may transition to State G 914 after a specified amount of time has elapsed with no requests for service made to the network device.

In State G, 914, the network device is shut down. The network device may enter this state in response to a manual power down of the network device or after transitioning from State F 912.

According to one embodiment of the invention, remote manager 128 causes the network device to change operational states based upon the satisfaction of one or more state change criteria. For example, remote manager 128 may cause the network device to transition from State A 902 to State B 904 if the network device has not received any communication after a specified amount of time. In this situation, remote manager 128 signals the network device to transition from State A 902 to State B 904 to reduce the amount of power consumed by the network device. If the network device receives a request for service, e.g., to print a document, the network device may itself transition from State B 904 back to State A 902 so that the specified function, i.e., the printing of the document, may be performed.

According to one embodiment of the invention, remote manager 128 determines whether the network device needs to perform the specified function, i.e., print an document, and if so, then the remote manager 128 signals the network device to transition from State B 904 to State A 902. On the other hand, if the network device does not receive a request for service within another specified amount of time, then the network device may transition from State B 904 to State C 906 to further conserve power by placing one or more mechanical components, such as a fuser, in a sleep mode. Alternatively, remote manager 128 may signal the network device to transition from State B 904 to State C 906 if the network device does not receive a request for service within the other specified amount of time.

Remote manager 128 may cause the network device to transition between any operational states, any number of times, at any position in hierarchy 900, depending upon the requirements of a particular implementation. For example, remote manager 128 may cause the network device to transition between State C 906 and State E 910, skipping State D 908. Remote manager 128 may also cause the network device to transition in either direction, up or down hierarchy 900.

Figure 10:
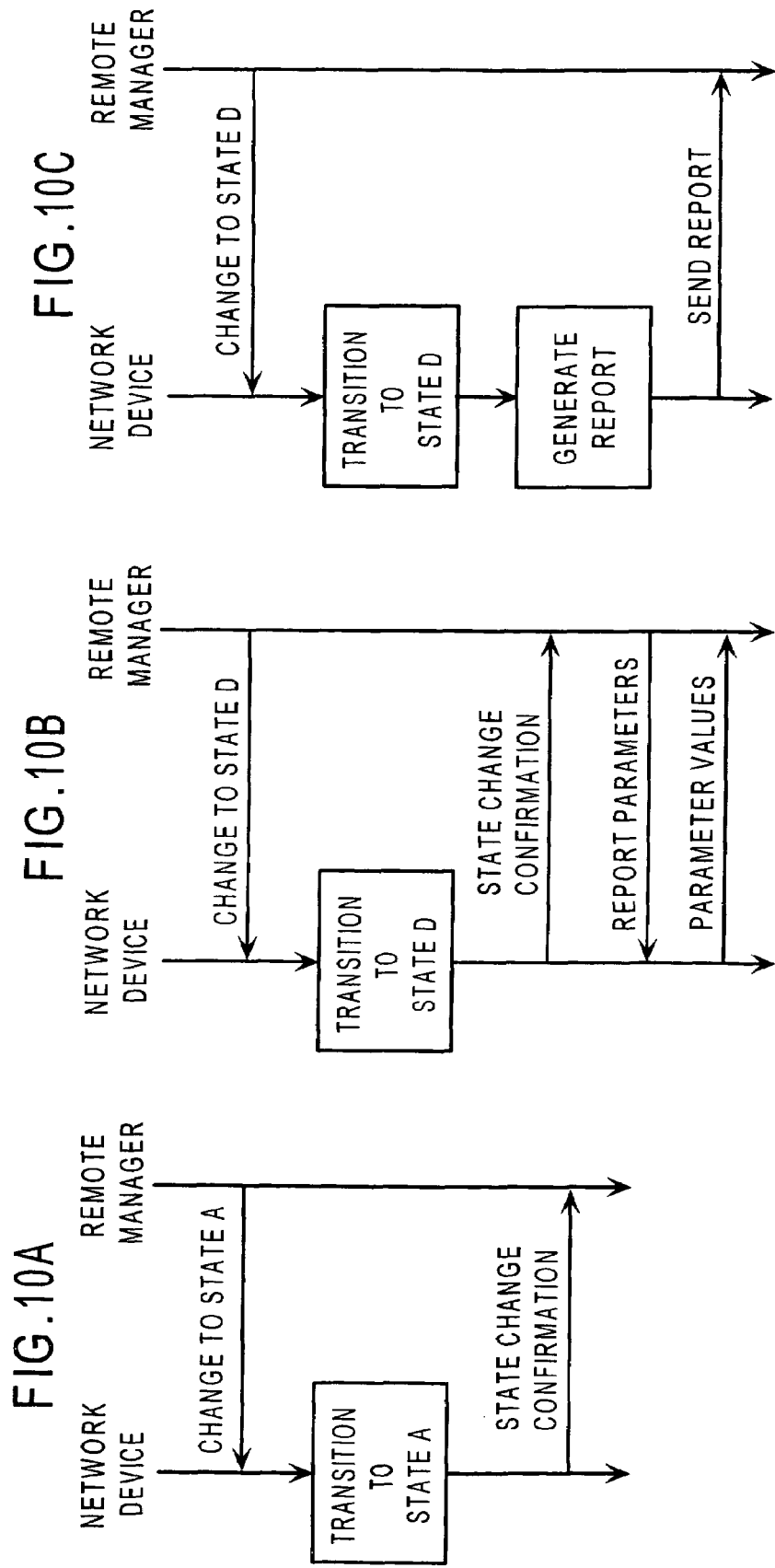
FIGS. 10A-10C are diagrams that depict example interactions between a network device and remote manager.

FIGS. 10A-10C are diagrams that depict example interactions between a network device and remote manager 128 according to an embodiment of the invention. FIG. 10A depicts interactions between the network device and remote manager 128 when one or more facility management functions are to be performed that requires that the network device be fully ready. In this situation, remote manager 128 sends to the network device a request for the network device to transition to State A 902. In response to receiving the request, the network device transitions to State A 902. The network device then generates and sends a state change confirmation message to remote manager 128. The state change confirmation message confirms that the network device successfully transitioned to State A 902.

FIG. 10B depicts interactions between the network device and remote manager 128 when remote manager 128 needs to retrieve the current operating parameters from the network device. Example operating parameters include, without limitation, the current status of the network device, a toner level and a page count. In this situation, the electronic components of the network device need to be at least in a low power mode. The mechanical components of the network device are not needed to perform this function. Accordingly, remote manager 128 sends to the network device a request that the network device transition to State D 908. In State D 908, the mechanical components of the network device are powered off and the electronic components of the network device are in a low power mode and can respond to requests.

In response to receiving the request, the network device transitions to State D 908. The network device may have been in any other state prior to receiving the request to transition to State D 908. The network device then generates and sends a state change confirmation message to remote manager 128. The state change confirmation message confirms that the network device successfully transitioned to State D 908. The remote manager 128 then generates and sends a request to report parameters to the network device. The network device sends its current parameter values to the remote manager 128.

FIG. 10C depicts interactions between the network device and remote manager 128 when remote manager 128 needs to receive a particular report from the network device. In this situation, the electronic components of the network device need to be at least in a low power mode. The mechanical components of the network device are not needed to perform this function. Accordingly, remote manager 128 sends to the network device a request that the network device transition to State D 908. In State D 908, the mechanical components of the network device are powered off and the electronic components of the network device are in a low power mode and can respond to requests.

In response to receiving the request, the network device transitions to State D 908. The network device may have been in any other state prior to receiving the request to transition to State D 908. The network device then generates the requested report and sends the report to remote manager 128. In this situation, a confirmation that the network device successfully transitioned to State D 908 is not generated and sent by the network device to the remote manager 128. Rather, receipt of the requested report by the remote manager 128 provides the confirmation that the network device successfully transitioned to State D 908. Thus, a state change confirmation message may not be required, depending upon the requirements of a particular implementation. For example, a monthly report of the system parameters such as print volume and toner consumption may be obtained using this approach.

Embodiments of the invention are described herein in terms of office applications. However, the approach may be applied to home environments to control the house heating system, the air conditioning system, the entertainment system, water heater and so on, when these appliances are connected through a network such as wireless home network to the control systems 102, 112 and 128.

VII. Example Multi-Function Peripheral (MFP) Architecture

One example of other devices 124 is a multi-function peripheral (MFP) that performs one or more functions, such as printing, copying, facsimile and scanning. A multitude of MFPs having a wide variety of combinations of functions is available and the invention is not limited to any particular type of MFP or an MFP configured to perform any particular combination of functions.

Figure 11:
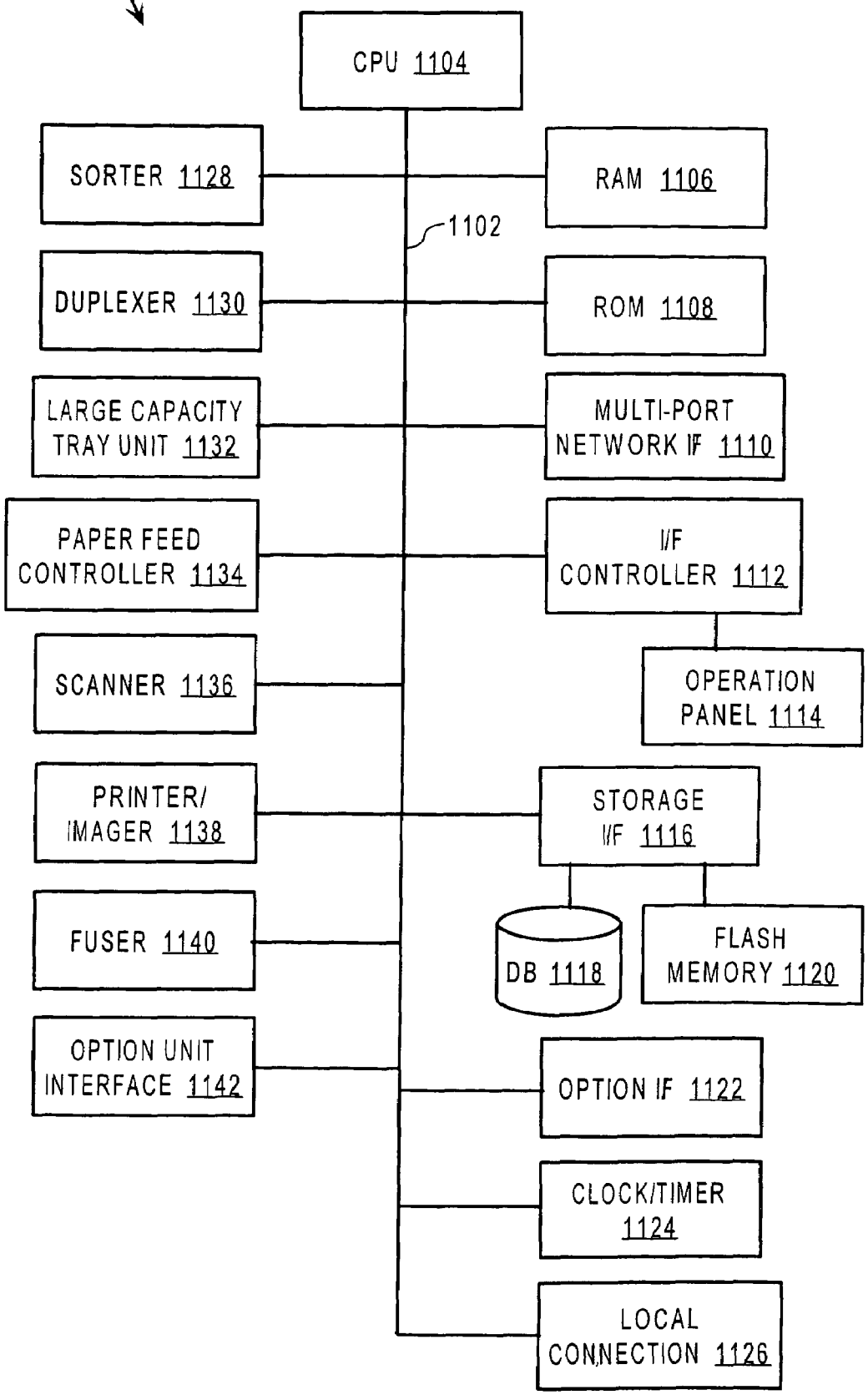
FIG. 11 is a block diagram that depicts an example implementation of an MFP.

FIG. 11 is a block diagram that depicts an example implementation 1100 of an MFP. Implementation 1100 includes several computer architecture components communicatively coupled via a communication bus 1102, namely, a central processing unit (CPU) 1104, a random access memory (RAM) 1106, a read-only memory (ROM) 1108, a multi-port network interface (I/F) 1110 that may be connected to both wired and wireless connections, an I/F controller 1112 with an attached operation panel 1114, a storage I/F 1116 with an attached database (DB) 1118 and flash memory 1120, an option I/F 1122, a clock/timer 1124 and a local connection 1126. Implementation 1100 also includes several physical components, such as a sorter 1128, a duplexer 1130, a large capacity tray unit 1132, a paper fee controller 1134, a scanner 1136, a printer/imager 1138, a fuser 1140 and an option unit interface 1142. The MFP elements depicted in FIG. 11 are provided as example elements and MFPs may contain additional elements or fewer elements, depending upon the requirements of a particular implementation.

VIII. Network Device Pre-Activation

As previously described herein, many network devices are configured to automatically transition to a low power state after a specified amount of time of inactivity has occurred. This allows network devices to manage and reduce their own power consumption. One of the drawbacks of this approach is that some network devices can require a substantial amount of time to transition back to a state where normal processing can resume. Some network devices with electromechanical components require a "warm-up" period before they can be used again.

For example, some printing devices are configured with a fuser that must be heated to a specified temperature before printing can occur. Fusers consume a relatively large amount of power compared to conventional electronic components. Thus, fusers are examples of components that are ideally suited for shutdown when a network device enters a standby mode because of the potential energy savings. Once a network device has entered a standby mode and a fuser has been allowed to cool however, a significant amount of time can be required for the network device to transition back to the fully operational mode. Thus, processing of the first task to be requested by the network device can be delayed. For example, suppose that a printing device is configured to transition into a standby mode after not receiving any print requests for at least a specified time. In the standby mode, power is removed from the fuser. When the next request is received, the printing device transitions from the standby mode to the full power mode. This includes providing power to the fuser so that the fuser can be brought up to operating temperature. This process may take several minutes, depending upon the particular configuration of the network device.

According to one embodiment of the invention, prior usage of a network device is used to estimate times when the network device will be used in the future. The network device is then pre-activated, i.e., transitioned to an active operational state, prior to the estimated times so that the network device will be ready when needed. This reduces or eliminates delays in processing attributable to having to wait for the network device to transition to the active operational state.

Figure 12:
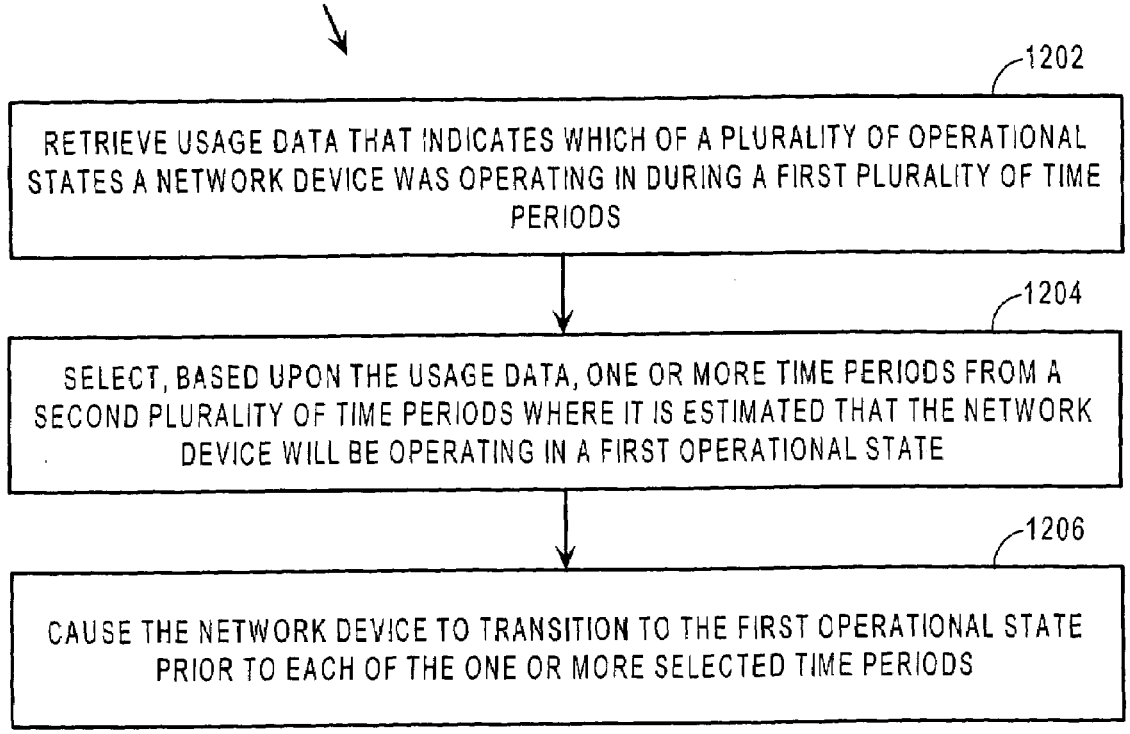
FIG. 12 is a block diagram that depicts an approach for managing a network device according to an embodiment of the invention.

FIG. 12 is a block diagram 1200 that depicts an overview of an approach for managing a network device according to an embodiment of the invention. In step 1202, usage data is retrieved that indicates which of a plurality of operational states the network device was operating in during a first plurality of time periods. The operational states may include any number and type of operational states, such as low power, inactive or sleep states and full power or active states. The first plurality of time periods may represent any time periods, such as minutes, hours in a day, days, weeks, months, etc. Thus, for example, the usage data may indicate that the network device was operating in a sleep mode state during certain time periods from the first plurality of time periods and was operating in an active mode during other time periods from the first plurality of time periods.

In step 1204, the usage data is evaluated and one or more time periods are selected from a second plurality of time periods where it is estimated that the network device will be operating in a first operational state from the plurality of operational states. The first operational state may be, for example, a fully active operational state that is required for processing data.

In step 1206, the network device is pre-activated, i.e., transitioned to the first operational state, prior to each of the selected one or more time periods. For example, suppose that in step 1204, the evaluation of the usage data indicates that the network device is consistently operating in an active operational state during a particular time on a particular day. This may occur, for example, in a situation where a particular processing task is scheduled for the network device at the particular time on the particular day. The network device is transitioned to the active operational state prior to the particular time on the next day that is the same as the particular day. For example, suppose it is determined from the evaluation of the usage data that a printing device is heavily used during 1-3 pm on Tuesdays. The printing device is pre-activated into an operational state that allows printing prior to 1 pm each Tuesday.

A. Usage Data

Figure 13:
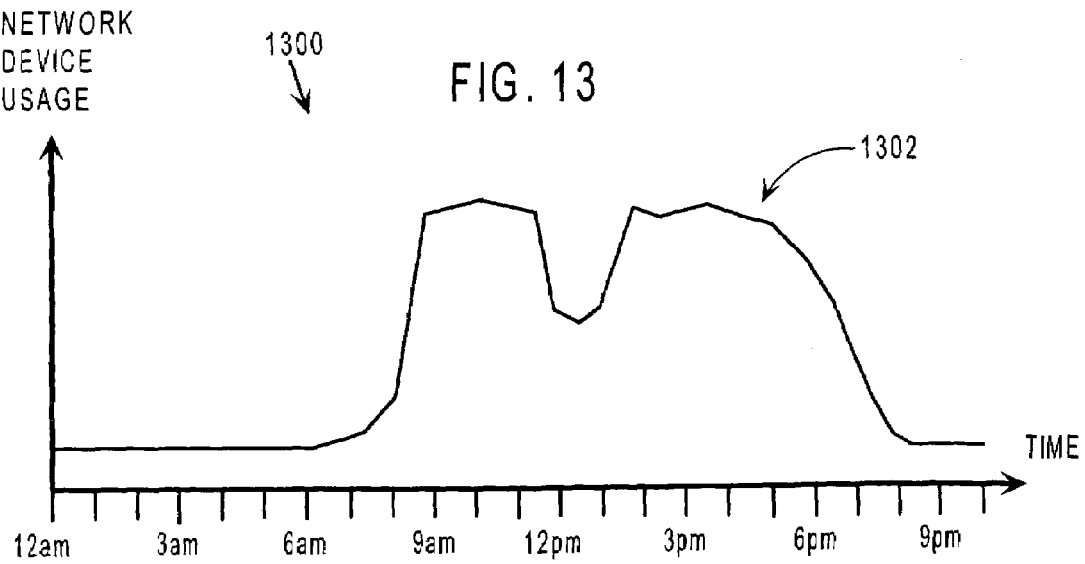
FIG. 13 includes a graph that visually depicts the usage of a network device over time and more specifically, the usage of the network device over a 24 hour period.

FIG. 13 includes a graph 1300 that visually depicts the usage of a network device over time and more specifically, the usage of the network device over a 24 hour period. The network device may be any type of network device, such as PC 118, copy machine 120, laboratory equipment 122 or other devices 124, such as routers, gateways, switches or other network elements. As indicated by graph 1300, the usage of the network device varies significantly throughout a 24 hour period. This variation may be attributable to a variety of factors, and in the present example, is attributable to a typical work schedule. In the present example, graph 1300 depicts relatively high levels of network traffic and/or network device usage during the peak morning hours of 8-12 am and the peak afternoon hours of 1:30-6 pm, with usage tapering off during the conventional lunch hour and from 6-8 pm as employees work later and then depart.

What constitutes "usage" of a network device may vary depending upon a particular implementation. For example, usage may refer to the fact that a network device is processing data, e.g., when a printing device is processing print data the network device is considered to be used. As another example, usage may refer to the fact that a network device is operating in a particular operational state. Suppose that a printing device has two operational states. One state is a normal operational state where the printing device is ready to process print data. The other operational state is a low power or sleep state where the printing device is not ready to process print data, but consumes less power. In this situation, the printing device may be considered used when the printing device is operating in the normal operational state.

The usage depicted in graph 1300 is only one of a myriad of possible usage patterns and the invention is not limited to any particular usage pattern. The usage of any particular network device may vary dramatically from other network devices, depending upon a particular context or application. For example, one printing device used by employees during the daytime may experience little or no usage during nighttime hours and therefore may operate in a low power or sleep mode during nighttime hours. Another printing device may be used extensively during the nighttime to print large reports, such as financial reports, that are needed early in the morning. Similarly, certain network devices that include backup mechanisms may be scheduled for operation during nighttime to reduce the strain on computational resources during the daytime.

B. Collecting and Storing Usage Data

Usage data may be collected and maintained using a variety of techniques and the invention is not limited to any particular technique. For example, usage data may be collected by network devices and provided to a central processing mechanism, such as power manager 126. The network devices may collect usage data in response to a request from power manager 126 or they may operate autonomously and collect usage data themselves. The network devices may then automatically provide the collected usage data to a central processing mechanism or store the usage data locally and provide the usage data in response to a query from a central processing mechanism. Alternatively, a monitoring mechanism may be used to monitor the activity of network devices and generate usage data. For example, power manager 126 may configured with a monitoring function to monitor the usage of PC 118, copy machine 120, laboratory equipment 122 and other devices 124 and generate usage data. Usage data may be stored at network devices or at a central processing mechanism in volatile or non-volatile memory, depending upon the requirements of a particular application. According to one embodiment of the invention, usage data is stored in non-volatile memory, such as flash memory, so that the data is maintained even if a device powers down or power is lost.

Usage data may reflect the usage of a network device over various periods of time. For example, graph 1300 may reflect the usage of a network device over a single 24-hour period. Alternatively, graph 1300 may reflect the usage of a network device over multiple 24-hour periods. Thus usage data may be collected over time and then processed. For example, usage data for a device may be collected over time and then averaged for specified time periods to provide an indication of the average usage during each time period. Other statistical methods may also be used to process usage data, depending upon the requirements of a particular application.

FIG. 14 depicts a table 1400 of example usage data collected for a printing device over a seven-day, 24 hours per day, period. A usage counter is used to track the number of times that the printing device operates in a particular operational state and processes print data, e.g., by printing electronic documents, during each 15 minute time period. As depicted in table 1400, the printing device is not processing print data late in the night (23:30; 23:45) and very early in the morning (00:00 through 00:30), except on Sunday, when special reports are printed for Monday morning. Table 1400 also depicts that the printing device is used most during the morning and afternoon and less during lunch and after normal business hours. In the example depicted in table 1400, the counter data reflects how often the printing device operates in one particular operational state. Counter data may be collected for any number of operational states, however, for example in situations where devices have several operational states.

The counter data may reflect time periods of different lengths, not just 15 minutes as depicted in table 1400. Furthermore, the counter data in table 1400 may represent an average of n number of weekly samples. For example, a sample counter 1402 indicates the number of weeks (n weeks) that the counter data reflects. Thus, the count of eight for the Tuesday 09:45 time period may represent an average count of nine for n number of Tuesday 09:45 time periods. The number of samples may be selected based upon the requirements of a particular implementation. The number of samples may also be tracked for each separate day. For example, a separate sample counter may be maintained for each day of the week. In this situation, the usage count for a particular day represents an average usage count for that day, based upon the number of samples for that day. Other statistical measures may be used besides average, such as median, mode, etc., and the invention is not limited to any particular statistical measure. Although FIG. 14 depicts the usage data in the form of a table, the invention is not limited to this context and usage data may be stored in any data format, data structure or arrangement.

The usage counter may be implemented in the printing device and the counter data may be provided automatically to a central processing mechanism, such as power manager 126, or queried from the printing device by power manager 126. Alternatively, some other mechanism may be used to collect the counter data.

C. Using Usage Data to Estimate Future Usage of a Network Device

According to one embodiment of the invention, usage data, that indicates when a network device has been used in the past, is used to estimate when network device will be used in the future. A variety of techniques may be used to analyze usage data to estimate when a network device will be used. For example, the average activity of a network device may be determined from usage data. Then, any time periods having an amount of activity greater than the average amount of activity are identified as time periods when the network device should be pre-activated. As another example, suppose that a usage counts are used to track the usage of a network device, as depicted in FIG. 14. According to one embodiment of the invention, in this situation, each usage count is compared to a specified threshold. Time periods that have a usage count greater than the specified threshold are identified as time periods when the network device should be pre-activated.

The particular threshold used may vary depending upon the requirements of a particular implementation and may be established, for example, by configuration data and/or through a graphical user interface (GUI). Suppose that the threshold is established at seven. In this situation, there are four time periods in table 1400 that have a usage count greater than seven: 15:00 on Monday; 09:45 on Tuesday; and 09:45 and 10:00 on Thursday. The network device is then activated prior to these times on these days so that delays attributable to activating the network device do not cause delays in processing data. The pre-activation may be repeated the same time and day each week until a change is warranted. In situations where such a transition may take several minutes, for example to allow time for a fuser to reach a threshold temperature, the transition is performed prior to the printing device actually being needed, which reduces delays when print jobs or print data is later processed. For example, suppose that a particular printing device requires six minutes to transition from a sleep or inactive operational state into an active operational state where the printing device is capable of processing and printing print data. In this situation, the particular printing device is transitioned into the active state at least six minutes prior to time periods where it is estimated, based upon usage data, that the particular printing device will be needed.

The use of a threshold may be combined with other approaches to select time periods for pre-activation. Rather than selecting for pre-activation all time periods having a usage count greater than a specified threshold, a subset of qualifying time periods may be selected. For example, the n number of time periods having the highest usage count greater than the specified threshold may be selected for pre-activation. Suppose that the threshold is established at seven and n is established at two. In this situation, there are four time periods in table 1400 that have a usage count greater than seven: 15:00 on Monday; 09:45 on Tuesday; and 09:45 and 10:00 on Thursday. The two time periods having the highest usage count, namely, 15:00 on Monday and 09:45 on Thursday, are selected for pre-activation. The network device is then activated prior to these times on these days so that delays attributable to activating the network device do not cause delays in processing data.

According to one embodiment of the invention, a minimum number of samples is required before pre-activation is used. For example, a particular implementation may specify that a minimum of ten samples is required before pre-activation is used. In this situation, the value of sample counter 1402 is checked against a specified threshold to determine whether usage data reflects a sufficient number of samples. If so, then times to use pre-activation are selected as previously described herein. If not, the pre-activation is not used and the network device is allowed to operate according to its normal configuration. This approach may be used on any size time periods, based upon the availability of sample counters. For example, if separate sample counters are maintained for each day in a week (seven), then the use of pre-activation as described herein may be made on a per-day basis.

D. Updates to Usage Data

In some situations, the usage of network devices changes over time. This may be attributable to a wide variety of factors, such as changes in network or network device configurations, relocation of network devices, relocation of users, changes in the type of work being done by users and changes in users' work habits and work schedules. According to one embodiment of the invention, usage data is periodically updated and re-evaluated to determine whether any changes should be made to the pre-activation schedule of network devices.

E. Using Pre-Activation with Building Access Detection

The pre-activation of network devices as described herein may be used in conjunction with building access detection. According to one embodiment of the invention, pre-activation may be temporarily suspended based when it is known that certain people are absent from a building, for example, during a company shutdown. A counter flag may be set to disable pre-activation for this purpose. The counter flag may then be reset at the end of a shutdown period. When the counter flag is set to disable pre-activation, the incrementing of the sample count may also be disabled, so that usage data collected during that period is not used.

According to another embodiment of the invention, normally-scheduled pre-activation of a particular network device is temporarily suspended if none of the persons who are associated with the particular network device are in the building. For example, suppose that laboratory equipment 122 is scheduled for pre-activation on Tuesdays at 9 am, based upon usage data, as described herein. Suppose further that on the next Tuesday at 9 am, none of the individuals associated with laboratory equipment 122 are in the building. This may be known, for example, from building access system 102. In this situation, pre-activation of laboratory equipment 122 is temporarily suspended. If, at the next pre-activation period, one or more persons associated with laboratory equipment 122 are in the building, then pre-activation may continue normally.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method for managing a network device, the method comprising:
   retrieving usage data that indicates which of a plurality of operational states a network device operated in during a first plurality of time periods;
   estimating, based upon the usage data, from a second plurality of time periods, one or more time periods when the network device will be operating in a first operational state from the plurality of operational states, wherein the second plurality of time periods is both different than the first plurality of time periods and occurs after the first plurality of time periods;
   detecting whether one or more individuals associated with the network device are in a building;
   if the one or more individuals associated with the network device are in the building, then causing the network device to transition to the first operational state prior to each of the one or more time periods, so that the network device is operating in the first operational state at a start of each of the one or more time periods; and
   if the one or more individuals associated with the network device are not in the building then not causing the network device to transition to the first operational state prior to each of the one or more time periods.

2. The method as recited in claim 1, wherein estimating, based upon the usage data, from a second plurality of time periods, one or more time periods when the network device will be operating in a first operational state from the plurality of operational states, includes determining, based upon the usage data, which of the first plurality time periods the network device operated in the first operational state.

3. The method as recited in claim 1, further comprising:
   retrieving additional usage data that indicates which of the plurality of operational states the network device operated in during a third plurality of time periods;
   estimating, based upon the usage data, from a fourth plurality of time periods, a second set of one or more time periods when the network device will be operating in the first operational state from the plurality of operational states; and
   causing the network device to transition to the first operational state prior to each of the second set of one or more time periods so that the network device is operating in the first operational state at the start of each of the second set of one or more time periods.

4. The method as recited in claim 1, wherein the network device consumes relatively more power when operating in the first operational state than any other of the plurality of operational states.

5. The method as recited in claim 1, wherein the network device requires relatively more time to transition to the first operational state than to transition to any other of the plurality of operational states.

6. The method as recited in claim 1, wherein:
   the usage data indicates, for each time period from the first plurality of time periods, a number of times that the network device was operating in the first operational state; and
   the estimating, based upon the usage data, from a second plurality of time periods, one or more time periods when the network device will be operating in a first operational state from the plurality of operational states includes determining which time periods from the first plurality of time periods that the network device operated in the first operational state at least a specified number of times.

7. The method as recited in claim 1, wherein:
   the usage data indicates, for each time period from the first plurality of time periods, a number of times that the network device was operating in the first operational state; and
   the estimating, based upon the usage data, from a second plurality of time periods, one or more time periods when the network device will be operating in a first operational state from the plurality of operational states includes determining a specified number of time periods from the first plurality of time periods that the network device operated the most in the first operational state.

8. The method as recited in claim 1, further comprising verifying that the usage data for the first plurality of time periods reflects at least a minimum number of times that the network device operated in the first operational state.

9. The method as recited in claim 1, wherein when operating in the first operational state, the network device is able to process requests.

10. A machine-readable medium for managing a network device, the machine-readable medium carrying sequences of instructions which, when executed by one or more processors, cause:
    retrieving usage data that indicates which of a plurality of operational states a network device operated in during a first plurality of time periods;
    estimating, based upon the usage data, from a second plurality of time periods, one or more time periods when the network device will be operating in a first operational state from the plurality of operational states, wherein the second plurality of time periods is both different than the first plurality of time periods and occurs after the first plurality of time periods;
    detecting whether one or more individuals associated with the network device are in a building;
    if the one or more individuals associated with the network device are in the building, then causing the network device to transition to the first operational state prior to each of the one or more time periods, so that the network device is operating in the first operational state at a start of each of the one or more time periods; and
    if the one or more individuals associated with the network device are not in the building, then not causing the network device to transition to the first operational state prior to each of the one or more time periods.

11. The machine-readable medium as recited in claim 10, wherein estimating, based upon the usage data, from a second plurality of time periods, one or more time periods when the network device will be operating in a first operational state from the plurality of operational states, includes determining, based upon the usage data, which of the first plurality time periods the network device operated in the first operational state.

12. The machine-readable medium as recited in claim 10, further comprising additional instructions which, when executed by the one or more processors, cause:

retrieving additional usage data that indicates which of the plurality of operational states the network device operated in during a third plurality of time periods;

estimating, based upon the usage data, from a fourth plurality of time periods, a second set of one or more time periods when the network device will be operating in the first operational state from the plurality of operational states; and causing the network device to transition to the first operational state prior to each of the second set of one or more time periods so that the network device is operating in the first operational state at the start of each of the second set of one or more time periods.

13. The machine-readable medium as recited in claim 10, wherein the network device consumes relatively more power when operating in the first operational state than any other of the plurality of operational states.

14. The machine-readable medium as recited in claim 10, wherein the network device requires relatively more time to transition to the first operational state than to transition to any other of the plurality of operational states.

15. The machine-readable medium as recited in claim 10, wherein:

the usage data indicates, for each time period from the first plurality of time periods, a number of times that the network device was operating in the first operational state; and the estimating, based upon the usage data, from a second plurality of time periods, one or more time periods when the network device will be operating in a first operational state from the plurality of operational states includes determining which time periods from the first plurality of time periods that the network device operated in the first operational state at least a specified number of times.

16. The machine-readable medium as recited in claim 10, wherein:

the usage data indicates, for each time period from the first plurality of time periods, a number of times that the network device was operating in the first operational state; and the estimating, based upon the usage data, from a second plurality of time periods, one or more time periods when the network device will be operating in a first operational state from the plurality of operational states includes determining a specified number of time periods from the first plurality of time periods that the network device operated the most in the first operational state.

17. The machine-readable medium as recited in claim 10, further comprising additional instructions which, when executed by the one or more processors, cause verifying that the usage data for the first plurality of time periods reflects at least a minimum number of times that the network device operated in the first operational state.

18. The machine-readable medium as recited in claim 10, wherein when operating in the first operational state the network device is able to process requests.

19. An apparatus for managing a network device, the apparatus comprising a memory storing sequences of instructions which, when executed by one or more processors, cause:

retrieving usage data that indicates which of a plurality of operational states a network device operated in during a first plurality of time periods;

estimating, based upon the usage data, from a second plurality of time periods, one or more time periods when the network device will be operating in a first operational state from the plurality of operational states, wherein the second plurality of time periods is both different than the first plurality of time periods and occurs after the first plurality of time periods;

detecting whether one or more individuals associated with the network device are in a building;

if the one or more individuals associated with the network device are in the building, then causing the network device to transition to the first operational state prior to each of the one or more time periods, so that the network device is operating in the first operational state at a start of each of the one or more time periods; and if the one or more individuals associated with the network device are not in the building, then not causing the network device to transition to the first operational state prior to each of the one or more time periods.

20. The apparatus as recited in claim 19, wherein estimating, based upon the usage data, from a second plurality of time periods, one or more time periods when the network device will be operating in a first operational state from the plurality of operational states, includes determining, based upon the usage data, which of the first plurality time periods the network device operated in the first operational state.

21. The apparatus as recited in claim 19, wherein the memory further stores additional instructions which, when executed by the one or more processors, cause:

retrieving additional usage data that indicates which of the plurality of operational states the network device operated in during a third plurality of time periods;

estimating, based upon the usage data, from a fourth plurality of time periods, a second set of one or more time periods when the network device will be operating in the first operational state from the plurality of operational states; and causing the network device to transition to the first operational state prior to each of the second set of one or more time periods so that the network device is operating in the first operational state at the start of each of the second set of one or more time periods.

22. The apparatus as recited in claim 19, wherein the network device consumes relatively more power when operating in the first operational state than any other of the plurality of operational states.

23. The apparatus as recited in claim 19, wherein the network device requires relatively more time to transition to the first operational state than to transition to any other of the plurality of operational states.

24. The apparatus as recited in claim 19, wherein:

the usage data indicates, for each time period from the first plurality of time periods, a number of times that the network device was operating in the first operational state; and the estimating, based upon the usage data, from a second plurality of time periods, one or more time periods when the network device will be operating in a first operational state from the plurality of operational states includes determining which time periods from the first plurality of time periods that the network device operated in the first operational state at least a specified number of times.

25. The apparatus as recited in claim 19, wherein:
the usage data indicates, for each time period from the first plurality of time periods, a number of times that the network device was operating in the first operational state; and
the estimating, based upon the usage data, from a second plurality of time periods, one or more time periods when the network device will be operating in a first operational state from the plurality of operational states includes determining a specified number of time periods from the first plurality of time periods that the network device operated the most in the first operational state.

26. The apparatus as recited in claim 19, wherein the memory further stores additional instructions which, when executed by the one or more processors, cause verifying that the usage data for the first plurality of time periods reflects at least a minimum number of times that the network device operated in the first operational state.

27. The apparatus as recited in claim 19, wherein when operating in the first operational state, the network device is able to process requests.

\* \* \* \* \*